United States Patent [19]
Aghajanian et al.

[11] Patent Number: 5,303,763
[45] Date of Patent: * Apr. 19, 1994

[54] DIRECTIONAL SOLIDIFICATION OF METAL MATRIX COMPOSITES

[75] Inventors: Michael K. Aghajanian; Robert C. Kantner, both of Newark, Del.; John P. Biel, Jr., Elkton, Md.; Kurt J. Becker, Newark, Del.

[73] Assignee: Lanxide Technology Company, LP, Newark, Del.

[ * ] Notice: The portion of the term of this patent subsequent to Jun. 4, 2008 has been disclaimed.

[21] Appl. No.: 980,418

[22] Filed: Nov. 23, 1992

Related U.S. Application Data

[63] Continuation-in-part of Ser. No. 520,927, May 9, 1990, Pat. No. 5,165,463, which is a continuation-in-part of Ser. No. 269,602, Nov. 10, 1988, Pat. No. 5,020,583.

[51] Int. Cl.$^5$ ............................................. B22D 19/14
[52] U.S. Cl. ........................................ 164/97; 164/101
[58] Field of Search ................... 164/97, 98, 100, 102, 164/101, 103, 104, 105, 122, 122.1

[56] References Cited

U.S. PATENT DOCUMENTS

| | | | |
|---|---|---|---|
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |
| 3,547,180 | 12/1970 | Cochran et al. | 164/61 |
| 3,608,170 | 9/1971 | Larson et al. | 29/149.5 |
| 3,695,335 | 10/1972 | Cannell et al. | 164/112 |
| 3,718,441 | 2/1973 | Landingham | 29/182.1 |
| 3,864,154 | 2/1975 | Gazza et al. | 29/123 B |
| 3,868,267 | 2/1975 | Gazza et al. | 117/22 |
| 3,915,699 | 10/1975 | Umehara et al. | 75/208 R |
| 3,969,553 | 7/1976 | Kondo et al. | 427/299 |
| 3,970,136 | 7/1976 | Cannell et al. | 164/108 |
| 4,082,864 | 4/1978 | Kendall et al. | 427/248 |
| 4,213,497 | 7/1980 | Sawyer | 164/122.2 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |

(List continued on next page.)

FOREIGN PATENT DOCUMENTS

| | | |
|---|---|---|
| 0071449 | 2/1983 | European Pat. Off. . |
| 0094353 | 11/1983 | European Pat. Off. . |
| 0115742 | 8/1984 | European Pat. Off. . |
| 0340957 | 11/1989 | European Pat. Off. . |
| 0364963 | 4/1990 | European Pat. Off. . |
| 2819076 | 10/1979 | Fed. Rep. of Germany . |
| 0144441 | 8/1983 | Japan . |
| 2156718 | 10/1985 | United Kingdom . |

OTHER PUBLICATIONS

F. Delannay, L. Froyen, and A. Deruyttere, "Review: The Wetting of Solids by Molten Metals and Its Relation to the Preparation of Metal-Matrix Composites", Journal of Materials Science, vol. 22, No. 1, pp. 1–16, Jan. 1987.

(List continued on next page.)

*Primary Examiner*—Paula A. Bradley
*Assistant Examiner*—Rex E. Pelto
*Attorney, Agent, or Firm*—Mark G. Mortenson; Carol A. Lewis

[57] ABSTRACT

A metal matrix composite is formed by contacting a molten matrix metal with a permeable mass of filler material or preform in the presence of an infiltrating atmosphere. Under these conditions, the molten matrix metal will spontaneously infiltrate the permeable mass of filler material or preform under normal atmospheric pressures. Once a desired amount of spontaneous infiltration has been achieved, or during the spontaneous infiltration step, the matrix metal which has infiltrated the permeable mass of filler material or preform is directionally solidified. The directionally solidified metal matrix composite may be heated to a temperature in excess of the liquidus temperature of the matrix metal and quenched. This technique allows the production of spontaneously infiltrated metal matrix composites having improved microstructures and properties.

8 Claims, 9 Drawing Sheets

U.S. PATENT DOCUMENTS

| | | | |
|---|---|---|---|
| 4,473,103 | 9/1984 | Kenney et al. | 164/97 |
| 4,559,246 | 12/1985 | Jones | 427/299 |
| 4,570,316 | 2/1986 | Sakamaki et al. | 29/156.8 R |
| 4,573,517 | 3/1986 | Booth et al. | 164/113 |
| 4,630,665 | 12/1986 | Novak et al. | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,687,042 | 8/1987 | Young | 164/98 |
| 4,712,413 | 12/1987 | Koch | 164/900 |
| 4,713,111 | 12/1987 | Cameron et al. | 75/68 R |
| 4,753,690 | 6/1988 | Wada et al. | 148/11.5 A |
| 4,777,097 | 10/1988 | Kubo et al. | 428/614 |
| 4,802,524 | 2/1989 | Donomoto | 164/97 |
| 4,828,008 | 5/1989 | White et al. | 164/66.1 |
| 4,871,008 | 10/1989 | Dwivedi et al. | 164/6 |
| 4,932,099 | 6/1990 | Corwin | 164/97 |
| 5,004,035 | 4/1991 | Burke et al. | 164/101 |
| 5,020,583 | 6/1991 | Aghajanian et al. | 164/122.1 |
| 5,165,463 | 11/1992 | Aghajanian | 164/97 |

OTHER PUBLICATIONS

G. R. Edwards and D. L. Olson, "The Infiltration Kinetics of Aluminum in Silicon Carbide Compacts", Annual Report from Center for Welding Research, Colorado School of Mines, under ONR Contract No. M00014-85-K-0451, DTIC Report AD-A184 682, Jul. 1987.

A. Mortensen, M. N. Gungor, J. A. Cornie, and M. C. Flemings "Alloy Microstructures in Cast Metal Matrix Composites", Journal of Metals, vol. 38, No. 3, pp. 30-35, Mar. 1986.

A. Mortensen, J. A. Cornie, and M. C. Flemings, "Solidification Processing of Metal-Matrix Composites", Journal of Metals, vol. 40, No. 2, pp. 12-19, Feb. 1988.

B. D. Sparks and F. W. Meadus, "The Development of an Infiltrated Lead/Iron Composite Material For Use as a Non-toxic Bird Shot", Composites, pp. 37-39, Jan. 1978.

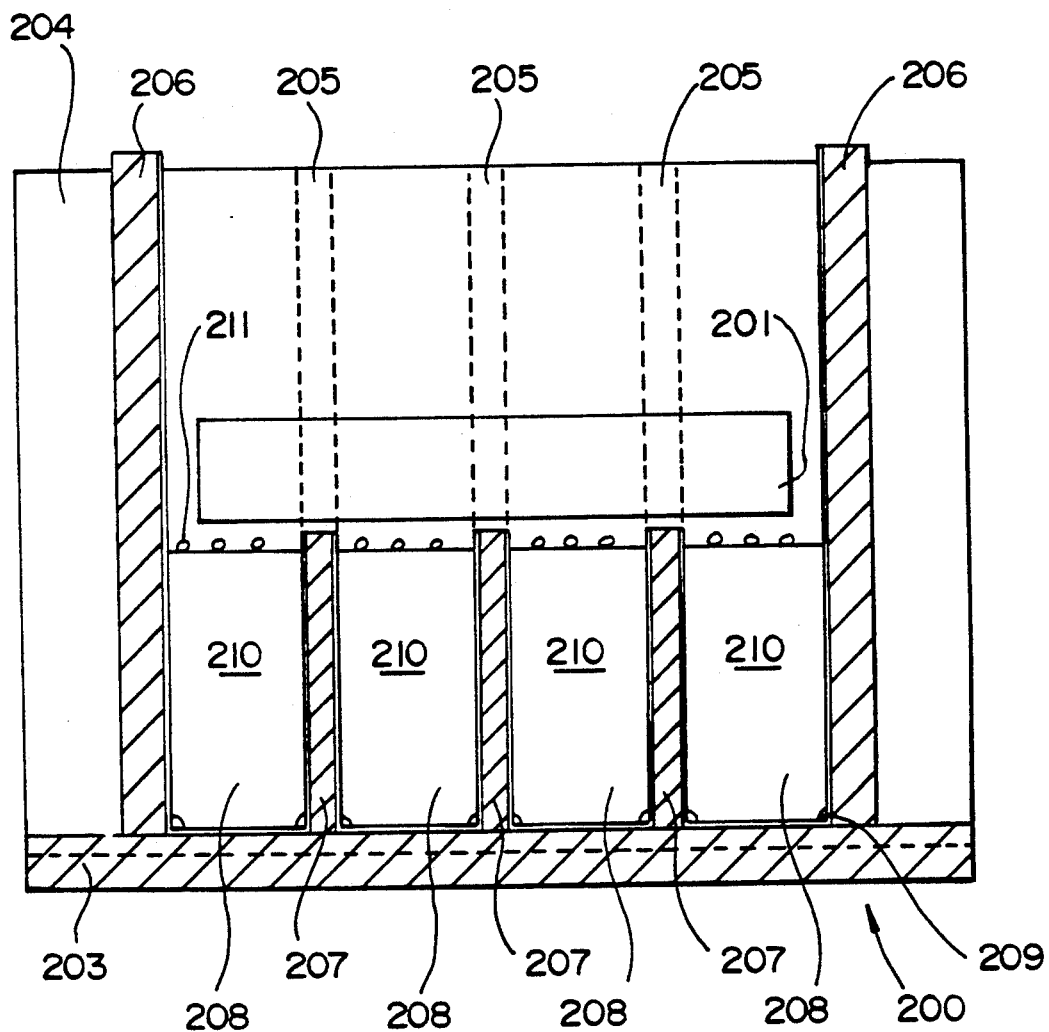

DIRECTIONAL SOLIDIFICATION OF METAL MATRIX COMPOSITES

CROSS-REFERENCE TO RELATED APPLICATIONS

The present invention is a continuation-in-part of U.S. patent application Ser. No. 07/520,927, filed May 9, 1990, now U.S. Pat. No. 5,165,463, which is a continuation-in-part of U.S. patent application Ser. No. 07/269,602, filed Nov. 10, 1988 now U.S. Pat. No. 5,020,583. The subject matter of application Ser. Nos. 07/520,927 and 07/269,602 is hereby expressly incorporated by reference.

FIELD OF THE INVENTION

The present invention relates to novel metal matrix composites and methods for making the same. Particularly, a permeable mass of filler material or a preform is spontaneously infiltrated (i.e., without the application of any applied pressure or vacuum) by a molten matrix metal in the presence of, at least at some point during the process, an infiltration enhancer and/or an infiltration enhancer precursor and/or an infiltrating atmosphere. Further, either during formation of the metal matrix composite, or substantially contiguous with the completion of forming the metal matrix composite, directional solidification of the matrix metal within the metal matrix composite is effected. Still further, the directionally solidified metal matrix composite may be reheated and quenched to provide even further improvements in the microstructure.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75-375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 0094353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies this need by providing a spontaneous infiltration mechanism for infiltrating a material (e.g., a ceramic material), which may be formed into a preform, with molten matrix metal (e.g., aluminum) in the presence of an infiltrating atmosphere (e.g., nitrogen) under atmospheric pressures so long as an infiltration enhancer is present at least at some point during the process.

Moreover, directional solidification is known generally to assist in metal casting processes to, for example, reduce porosity and/or voids in a body, increase tensile strength, modify microstructure, etc. The combination of directional solidification techniques with the spontaneous infiltration mechanisms of the present invention provides novel metal matrix composite bodies.

DESCRIPTION OF COMMONLY OWNED U.S. PATENTS AND PATENT APPLICATIONS

The subject matter of this application is related to that of several co-owned Patents and several other copending and co-owned patent applications. Particularly, the patents and other copending patent applications describe novel methods for making metal matrix composite materials (hereinafter sometimes referred to as "Commonly Owned Metal Matrix Patents and Patent Applications").

A novel method of making a metal matrix composite material is disclosed in Commonly Owned U.S. Pat. No. 4,828,008, which issued May 9, 1989, from U.S. patent application Ser. No. 049,171, filed May 13, 1987, in the names of White et al., and entitled "Metal Matrix Composites" and which published in the EPO on Nov. 10, 1988, as Publication No. 0291441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention permits the choice of a balance between infiltration kinetics and nitride formation.

An example of suitable barrier means for use with metal matrix composite formation is described in Commonly Owned U.S. Pat. No. 4,935,055, which issued on Jun. 19, 1990, from U.S. patent application Ser. No. 07/141,642, filed Jan. 7, 1988, in the names of Michael K. Aghajanian et. al., and entitled "Method of Making Metal Matrix Composite with the Use of a Barrier", and which published in the EPO on Jul. 12, 1989, as Publication No. 0323945. According to the method of this Aghajanian et al. invention, a barrier means (e.g., particulate titanium diboride or a graphite material such as a flexible graphite tape product sold by Union Carbide under the trademark GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/517,541, filed Apr. 24, 1990, which is a continuation of U.S. patent application Ser. No. 07/168,284, filed Mar. 15, 1988, in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in these U.S. Patent Applications, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (i.e., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body, (e.g., a macrocomposite) wherein an infiltrated ceramic body having a metal matrix therein will be directly bonded to excess metal remaining in the reservoir.

Further improvements in metal matrix technology can be found in commonly owned and copending U.S. patent application Ser. No. 07/521,043, filed May 9, 1990, entitled "A Method of Forming Metal Matrix Composite Bodies by a Spontaneous Infiltration Process, and Products Produced Therefrom", which is a Continuation-in-Part application of U.S. patent application Ser. No. 07/484,753, filed Feb. 23, 1990, which is a continuation-in-part application of U.S. patent application Ser. No. 07/432,661, filed Nov. 7, 1989, which is a continuation-in-part application of U.S. patent application Ser. No. 07/416,327, filed Oct. 6, 1989, which is a continuation-in-part application of U.S. patent application Ser. No. 07/349,590, filed May 9, 1989, which in turn is a continuation-in-part application of U.S. patent application Ser. No. 07/269,311, filed Nov. 10, 1988, all of which were filed in the names of Michael K. Aghajanian et al. and all of which are entitled "A Method of Forming Metal Matrix Composite Bodies By A Spontaneous Infiltration Process, and Products Produced Therefrom". According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian et al. application that the spontaneous infiltration behavior should occur in other matrix metal/infiltration enhancer precursor/infiltrating atmosphere systems.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite is produced by spontaneously infiltrating a permeable mass of filler material (e.g., a ceramic or a ceramic coated material) or a preform with a molten matrix metal. The filler material may be shaped or contained within an appropriate mold or barrier means. Moreover, a precursor to an infiltration enhancer and/or an infiltration enhancer and/or an infiltrating atmosphere are in communication with the filler material or preform, at least at some point during the process, which permits the molten matrix metal to spontaneously infiltrate the permeable mass of filler material or preform. At some point after formation of the metal matrix composite, the composite is subjected to a directional solidification technique which enhances the properties of the metal matrix composite body. In one preferred embodiment, the filler material may include an infiltration enhancer precursor therein. The filler material can thereafter be contacted with an infiltrating atmosphere to form the infiltration enhancer at least in a portion of the filler material. Such an infiltration enhancer can be formed prior to or substantially contiguous with contacting of the molten matrix metal with the filler material. Moreover, an infiltrating atmosphere may be provided during substantially all of the spontaneous infiltration process and thus may be in communication with a filler material or alternatively, may communicate with the filler material and/or matrix metal for only a portion of the spontaneous infiltration process. Ultimately, it is desirable that at least during the spontaneous infiltration, the infiltration enhancer should be located in at least a portion of a filler material.

Moreover, in a further preferred embodiment of the invention, rather than supplying an infiltration enhancer precursor to the filler material, an infiltration enhancer may be supplied directly to at least one of the filler material and/or matrix metal and/or infiltrating atmosphere. Again, ultimately, at least during the spontaneous infiltration, the infiltration enhancer should be located in at least a portion of the filler material.

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner and are intended to be encompassed by the invention.

When the matrix metal comprises an aluminum alloy, the aluminum alloy is contacted with a mass of filler material or a preform comprising a filler material (e.g., alumina or silicon carbide), said filler material having admixed therewith magnesium and/or at some point during the process being exposed to magnesium. Moreover, in a preferred embodiment, the aluminum alloy and/or filler material or preform are contained in a nitrogen atmosphere for at least a portion of the process. The mass of filler material or preform will be spontaneously infiltrated and the extent or rate of spontaneous infiltration and formation of metal matrix composite will vary with a given set of process conditions including, for example, the concentration of magnesium provided to the system (e.g., in the aluminum alloy and/or in the filler material and/or in the infiltrating atmosphere), the size and/or composition of the particles in the filler material, the concentration of nitrogen in the infiltrating atmosphere, the time permitted for infiltration, and/or the temperature at which infiltration occurs. Spontaneous infiltration typically occurs to an extent sufficient to embed substantially completely the mass of filler material or preform.

Still further, it has been discovered that the microstructure, and thus the properties, of a spontaneously infiltrated metal matrix composite body can be improved by the utilization of directional solidification. Specifically, once spontaneous infiltration of the filler material has been achieved, and/or substantially near the completion of the spontaneous infiltration, at least one of a heating means located at one side of the composite and/or a cooling means located at one side of the composite can be applied. If both of a heating means and a cooling means are applied to the composite, the heating and cooling means should be positioned at substantially opposite ends of the composite. Specific examples of heating means suitable for achieving directional solidification include hot plates, hot-topping materials, etc. Metal matrix composites which are produced by a spontaneous infiltration process and which have been directionally solidified may have improved microstructures relative to metal matrix composites made by a similar technique, however, without being subjected to directional solidification. For example, the microstructures may be more uniform, may exhibit a reduced amount of porosity or voids, etc. Such improved microstructures may result in an enhancement of mechanical properties, including a greater tensile strength, higher fracture toughness, etc.

Moreover, it has been discovered that the distribution, morphology, and/or size of precipitates (e.g., $Mg_2Si$, when aluminum, magnesium, and silicon are all provided to the spontaneous system, intermetallics of aluminum-copper and/or nickel, etc.) within the metallic phase can be controlled with greater accuracy when the mold within which a metal matrix composite has been fabricated is removed and the metal matrix composite body per se is directionally solidified. For example, by reheating and directionally solidifying a formed metal matrix composite body, the microstructure of the body can be improved relative to a body which has been directionally solidified in a mold. Specifically, a formed metal matrix composite is heated to a temperature in excess of the liquidus temperature of the matrix metal to permit precipitates within the metallic phase of the metal matrix composite to disassociate or go back into solution with the matrix metal. The heated metal matrix composite is thereafter directionally solidified (e.g., quenched), and the cooling rate associated with the directional solidification occurs at a rate which is sufficiently rapid to ameliorate any undesirable precipitation which may have a tendency to occur, while not inducing damaging thermal shock.

A metal matrix composite body formed according to the present invention may be heated to a temperature in excess of the liquidus temperature of the matrix metal without substantially altering the original configuration (e.g., slump does not occur). Specifically, a metal matrix composite of the present invention when reheated, as discussed above, will possess a thixotropic rheology (e.g., the formed metal matrix composite will maintain its size and shape until an adequate force is exerted upon the composite). As a result, the present invention permits the directional solidification of a metal matrix composite, per se, resulting in an improved microstructure without loss of the original dimensional integrity. For example, the improved microstructure of a quenched metal matrix composite may possess precipitates (e.g., $Mg_2Si$, when aluminum, magnesium, and silicon are all provided to the spontaneous system) which: (1) are distributed homogeneously throughout the matrix metal, (2) are reduced in size, and (3) exhibit a desired morphology. Such improved microstructure possesses a reduced quantity of flaws or defects (e.g., occlusions of large precipitates of $Mg_2Si$) that may weaken the mechanical properties of the formed matrix metal composite body. Accordingly, the present invention may enhance the bend strength, fracture toughness, etc., of the formed metal matrix composite.

A further preferred embodiment of the invention includes the use of a sacrificial area into which any porosity or void space is directed, and which is created due to directional solidification. In some cases, the sacrificial area may comprise residual matrix metal which was not utilized to achieve substantially complete infiltration. However, in some cases, the presence of residual matrix metal may result in unacceptable thermal stress in the composite body. Specifically, the coefficient of thermal expansion of residual matrix metal, typically, differs from that of the formed metal matrix composite body. Accordingly, special design considerations must be made for the size, shape, and/or location of the sacrificial area, relative to the metal matrix composite body which is to be formed. The sacrificial area may also include a filler material or preform which contacts the metal matrix composite body and which also is infiltrated by the residual matrix metal. Moreover, the filler material-containing sacrificial area may simplify handling of the formed metal matrix composite body relative to a sacrificial area which comprises only residual matrix metal.

Specific examples of cooling means suitable for achieving directional solidification and/or quenching include cooling plates; sequentially removing an at least partially formed metal matrix composite from a heating furnace; and/or contacting an at least partially formed metal matrix composite with at least one fluid medium (e.g., liquid, gas, etc.).

Various specific embodiments of the invention are discussed in greater detail later herein.

DEFINITIONS

"Alloy Side", as used herein, refers to that side of the metal matrix composite which initially contacted molten metal before that molten metal infiltrated the preform or mass of filler material.

"Aluminum", as used herein means, and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity, and is not substantially volatile (i.e., the barrier material does not volatilize to such an extent that it is rendered nonfunctional as a barrier).

Further, suitable "barrier means" include materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also typically include a second or foreign metal therein.

"Filler", as used herein, is intended to include either single constituents or mixtures of constituents which are substantially nonreactive with and/or of limited solubility in the matrix metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals in any desired configuration.

"Hot-Topping", as used herein, refers to the placement of a substance on one end (the "topping" end) of an at least partially formed metal matrix composite which reacts exothermically with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal.

"Infiltration Enhancer", as used herein, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed from a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite body (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibits spontaneous infiltration into a preform or filler material. It should be understood that whenever a "/" appears between an exemplary matrix metal, infiltration enhancer precursor and infiltrating atmosphere, the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or mass of filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform. The reservoir may also be used to provide a metal which is different from the matrix metal.

"Spontaneous Infiltration", as used herein, means the infiltration of a matrix metal into a permeable mass of filler or preform that occurs without the requirement of application of pressure or vacuum (whether externally applied or internally created).

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein:

FIG. 3 also shows the directional solidification assembly utilized in Example 1;

FIG. 10 is a cross-sectional view of the lay-up utilized in Example 3 to obtain a metal matrix composite which was reheated and quenched;

DETAILED DESCRIPTION OF THE INVENTION AND PREFERRED EMBODIMENTS

Figure 1:
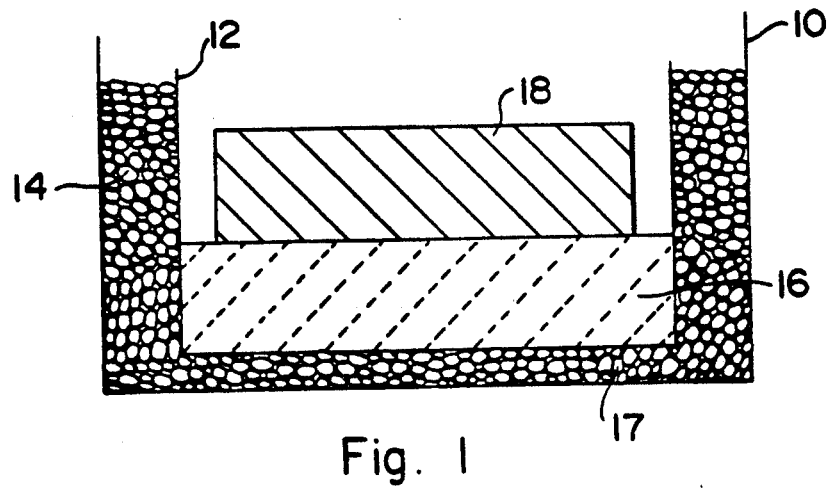
FIG. 1 is a cross-sectional view of the materials utilized in Example 1 to obtain a spontaneous infiltration of a first preform.

An initial step in the present invention is to select a suitable combination of materials to achieve spontaneous infiltration (e.g., selection of matrix metal, filler material or preform, infiltration enhancer and/or infiltration enhancer precursor, alloying constituents (if necessary) and/or infiltrating atmosphere). The present invention utilizes the synergistic effect which results from the combination of the materials used to achieve spontaneous infiltration. After selecting an appropriate combination of materials and achieving spontaneous infiltration, the infiltrated mass of filler or infiltrated preform is thereafter (or substantially simultaneously with the infiltration) directionally solidified by an appropriate directional solidification technique. Specific directional solidification techniques suitable for use in combination with the spontaneous infiltration technique are discussed later herein.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the mass of permeable filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment, it is possible that the infiltration enhancer precursor can be at least partially reacted with the infiltrating atmosphere such that infiltration enhancer can be formed in at least a portion of the filler material prior to, or substantially simultaneously with, contacting the filler material with the matrix metal (e.g., if magnesium was the infiltration enhancer precursor and nitrogen was the infiltrating atmosphere, the infiltration enhancer could be magnesium nitride which would be located in at least a portion of the filler material).

An example of a matrix metal/infiltration enhancer precursor/infiltrating atmosphere system is the aluminum/magnesium/nitrogen system.

Under the conditions employed in the method of the present invention, in the case of an aluminum/magnesium/nitrogen spontaneous infiltration system, the mass of filler material or preform should be sufficiently permeable to permit the nitrogen-containing gas to penetrate or permeate the filler material at some point during the process and/or contact the molten matrix metal. Moreover, the mass of filler material or preform can accommodate infiltration of the molten matrix metal, thereby causing the nitrogen-permeated mass of filler material or preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent or rate of spontaneous infiltration and formation of the metal matrix composite will vary with a given set of process conditions, including magnesium content of the aluminum alloy, magnesium content of the filler material or preform, amount of magnesium nitride in the filler material or preform, the presence of additional alloying elements (e.g., silicon, iron, copper, manganese, chromium, zinc, and the like), average size of the filler material (e.g., particle diameter) comprising the preform, surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1% by weight, and preferably at least about 3% by weight, magnesium (which functions as the infiltration enhancer precursor), based on alloy weight. Auxiliary alloying elements, as discussed above, may also be included in the matrix metal to tailor specific properties thereof. (Additionally, the auxiliary alloying elements may affect the minimum amount of magnesium required in the matrix aluminum metal to result in spontaneous infiltration of the filler material or preform.) Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform and matrix metal, or the preform alone, may result in a reduction in the required amount of magnesium needed to achieve spontaneous infiltration (discussed in greater detail later herein). The volume percent of nitrogen in the nitrogen atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform, or it may be produced or result from a decomposition of a material.

The minimum magnesium content required for molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or filler material or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the filler material or preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 CRYSTOLON ® (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform is contacted with a similar aluminum matrix metal, at about the same temperature as the aluminum that infiltrated into the silicon carbide preform, and in the presence of the same nitrogen atmosphere, at least about 3% by weight magnesium may be required to achieve spontaneous infiltration similar to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). If the magnesium was applied to a surface of the matrix metal, it may be preferred that said surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the filler material or preform could be used. Such combination of applying infiltration enhancer(s) and/or infiltration enhancer precursor(s) could result in a decrease in the total weight percent of magnesium needed to promote infiltration of the matrix aluminum metal into the filler material or preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g. to at least about 5 weight percent; and/or (2) when alloying constituents are mixed with the permeable mass of filler material; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable, dependent upon the intended application of the metal matrix composite body. Additionally, electric resistance heating is typically used to achieve the infiltrating temperatures. However, any heating means which can cause the matrix metal to become molten, and does not adversely affect spontaneous infiltration, is acceptable for use with the invention.

In the present method, for example, a permeable mass of filler material or a preform comes into contact with molten aluminum in the presence of, at least sometimes during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal.

The method of forming a metal matrix composite is applicable to a wide variety of filler materials, and the choice of filler materials will depend on such factors as the matrix metal, the process conditions, the reactivity of the molten matrix metal with the filler material, and the properties sought for the final composite product. For example, when aluminum is the matrix metal, suitable filler materials include (a) oxides, e.g. alumina; (b) carbides, e.g. silicon carbide; (c) borides, e.g. aluminum dodecaboride, and (d) nitrides, e.g. aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a coating to protect the substrate from attack or degradation (e.g., a filler material or preform which comprises carbon fibers coated with silicon carbide). Suitable coatings can be ceramics such as oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to other filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, which issued on Jul. 25, 1989, entitled "Methods of Making Composite Ceramic Articles Having Embedded Filler", in the names of Marc S. Newkirk et al, also exhibit desirable infiltration properties relative to commercially available alumina products. The subject matter of each of the issued Patents is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patents.

The size and shape of the filler material can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable (i.e., permeable to molten matrix metal and to the infiltrating atmosphere).

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified, provided that the mass is not converted into either a compact with closed cell porosity or into a fully dense structure that would prevent infiltration by the molten matrix metal.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the filler material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred graphite is a graphite tape product that is sold under the trademark GRAFOIL®, registered to Union Carbide. This graphite tape exhibits sealing characteristics that prevent the migration of molten aluminum alloy beyond the defined surface boundary of the filler material. This graphite tape is also resistant to heat and is chemically inert. GRAFOIL® graphite material is flexible, compatible, conformable and resilient. It can be made into a variety of shapes to fit any barrier application. However, graphite barrier means may be employed as a slurry or paste or even as a paint film around and on the boundary of the filler material or preform. GRAFOIL® is particularly preferred because it is in the form of a flexible graphite sheet. In use, this paper-like graphite is simply formed around the filler material or preform.

Other preferred barrier(s) for infiltrating aluminum metal matrix alloys in a nitrogen environment are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatility organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Once a desired amount of spontaneous infiltration has been achieved, or during the spontaneous infiltration (e.g., substantially near the completion of spontaneous infiltration), a means for directionally solidifying the metal matrix composite is utilized. Various acceptable means for directionally solidifying the metal matrix composite can be utilized including "hot-topping" at least one surface of the metal matrix composite; and/or contacting a surface of the metal matrix composite with a stationary heat sink, such as a chill plate; and/or contacting or sequentially immersing the metal matrix composite in a fluid body (either stationary or flowing); and/or sequentially removing the metal matrix composite from the furnace in which it was formed; etc. By utilizing one or more of these directional solidification techniques, either alone or in combination, it is possible to enhance the properties of a metal matrix composite produced by a spontaneous infiltration technique. For example, metal matrix composites having: improved microstructures (e.g., more uniform); a reduced amount of porosity or voids in the microstructure; greater tensile strength; etc., relative to similarly produced metal matrix composites which were not directionally solidified, can be achieved. As shown in FIGS. 5a and 5b, and FIGS. 6a and 6b, the directional solidification of a metal matrix composite body reduces the porosity in the composite body and creates a more uniform microstructure in comparison to a metal matrix composite body which is not directionally solidified. Moreover, as demonstrated in Example 1, fiber reinforced metal matrix composites which have been directionally solidified have greater tensile strengths than similar composites which have not been directionally solidified.

Figure 5A:
FIGS. 5a and 5b are optical photomicrographs of a non-directionally solidified metal matrix composite containing alumina fibers.
Figure 5B:
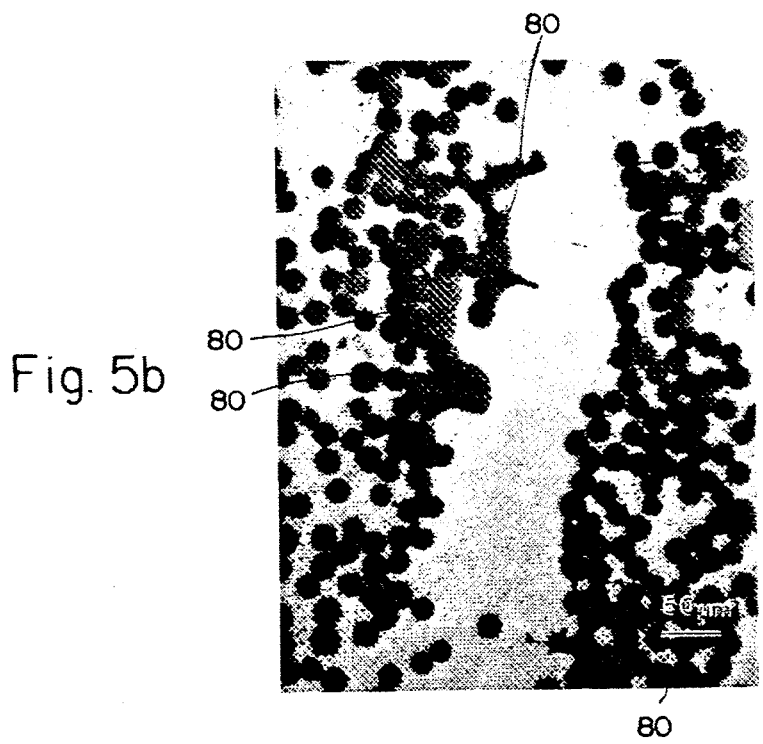
Figure 6A:
FIGS. 6a and 6b are optical photomicrographs of a directionally solidified metal matrix composite containing alumina fibers.
Figure 6B:
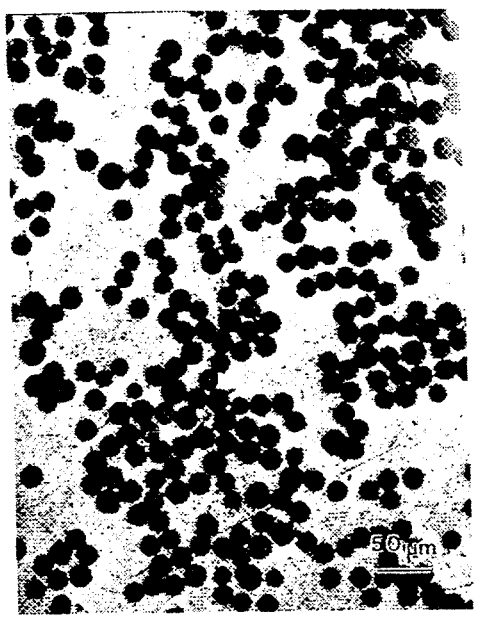

Specifically, FIGS. 5a, 5b, 6a and 6b are optical photomicrographs of metal matrix composites containing alumina fibers. Each set of figures displays photomicrographs at two levels of magnification. FIGS. 5a and 5b show a metal matrix composite which was furnace cooled, i.e., not directionally solidified. FIGS. 6a and 6b show a metal matrix composite body which has undergone directional solidification.

As indicated by the lines labelled 80 in FIGS. 5a and 5b, the metal matrix composite which was not directionally solidified displays regions of porosity or void space where there is no matrix metal. In contrast, it is readily apparent from FIGS. 6a and 6b that the directionally solidified metal matrix composite contains substantially less porosity or void space therein. Moreover, the metal matrix composite displayed in FIGS. 6a and 6b has a more uniform microstructure than the metal matrix composite displayed in FIGS. 5a and 5b. Particularly, this increase in uniformity is evidenced by the greater dispersion of fibers in the matrix metal.

Applicants believe that the increase in tensile strength of the directionally solidified metal matrix composites described in Example 1, relative to the non-directionally solidified composites, was due at least in part to the reduction in porosity or void space obtained upon the directional solidification of the metal matrix composite. Particularly, porosity or void space reduces the load bearing area within the metal matrix composite, thereby reducing the tensile strength of the composite. Thus, reduction of the porosity or void space would lead to a greater load bearing area within the metal matrix composite and a corresponding increase in tensile strength. Further, the reduction of the porosity or void space within the metal matrix composite may cause some shrinkage of the metal matrix composite. This shrinkage may be compensated for by providing a reservoir of additional matrix metal which is in contact with at least a portion of the metal matrix composite during directional solidification.

Figure 7:
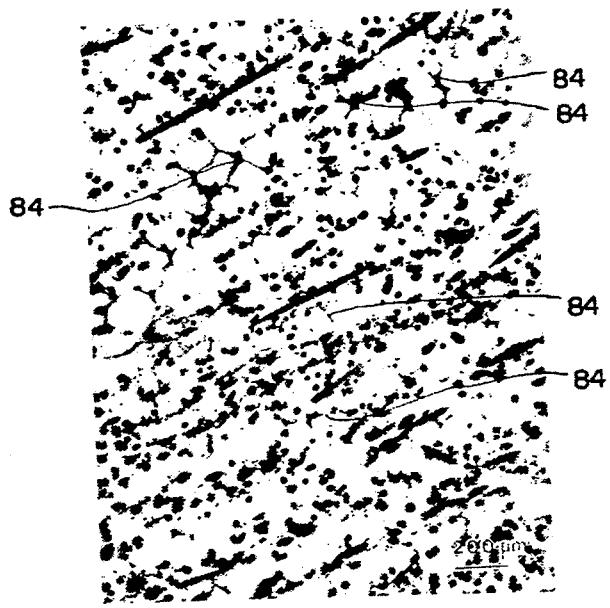
FIG. 7 is an optical photomicrograph of a furnace non-directionally solidified metal matrix composite containing alumina fibers.
Figure 8:
FIG. 8 is an optical photomicrograph of a directionally solidified metal matrix composite containing alumina fibers.

FIGS. 7 and 8 are further optical photomicrographs of two metal matrix composites containing alumina fibers. FIG. 7 displays the microstructure of a metal matrix composite which was not directionally solidified, whereas FIG. 8 displays the microstructure of a metal matrix composite which has undergone directional solidification. In fact, FIG. 8 displays the microstructure of the metal matrix composite which was directionally solidified in Example 1. The lines in FIG. 7 labelled 84 indicate regions of porosity or void space in the metal matrix composite. An examination of FIG. 8 reveals that any regions of porosity or void space which may have existed in the metal matrix composite prior to undergoing directional solidification were either substantially reduced or eliminated upon directional solidification. Thus, FIGS. 7 and 8 provide further evidence that a reduction in porosity or void space and a more uniform microstructure can be achieved through the directional solidification of metal matrix composites produced by the spontaneous infiltration of a matrix metal into a mass of filler material or a preform.

While many of the directional solidification means discussed herein are described as contacting the formed metal matrix composite directly, it should be understood that these descriptions are merely illustrative and that the composite is usually contained within at least a suitable refractory container during the directional solidification step. Thus, when a particular directional solidification means is described as contacting a particular part of the composite, it should be understood that the directional solidification means may in fact be contacting that end of a setup which is closest to the described part of the composite. The directional solidification of setups containing metal matrix composites is demonstrated in the following Examples. However, these Examples should be considered as being illustrative and should not be construed as limiting the scope of the invention as defined in the appended claims.

Moreover, it has been discovered that the distribution, morphology, and/or size of precipitates (e.g., $Mg_2Si$, when aluminum, magnesium, and silicon are all provided to the spontaneous system, intermetallics of aluminum-copper and/or nickel, etc.) within the metallic phase can be controlled with greater accuracy when the mold within which a metal matrix composite has been fabricated is removed and the metal matrix composite body per se is directionally solidified. For example, by reheating and directionally solidifying a formed metal matrix composite body, the microstructure of the body can be improved relative to a body which has been directionally solidified in a mold. Specifically, a formed metal matrix composite is heated to a temperature in excess of the liquidus temperature of the matrix metal to permit precipitates within the metallic phase of the metal matrix composite to disassociate or go back into solution with the matrix metal. The heated metal matrix composite is thereafter directionally solidified (e.g., quenched), and the cooling rate associated with the directional solidification occurs at a rate which is sufficiently rapid to ameliorate any undesirable precipitation which may have a tendency to occur, while not inducing damaging thermal shock.

A metal matrix composite body formed according to the present invention may be heated to a temperature in excess of the liquidus temperature of the matrix metal without substantially altering the original configuration (e.g., slump does not occur). Specifically, a metal matrix composite of the present invention when reheated, as discussed above, will possess a thixotropic rheology (e.g., the formed metal matrix composite will maintain its size and shape until an adequate force is exerted upon the composite). As a result, the present invention permits the directional solidification of a metal matrix composite, per se, resulting in an improved microstructure without loss of the original dimensional integrity. For example, the improved microstructure of a quenched metal matrix composite may possess precipitates (e.g., $Mg_2Si$, when aluminum, magnesium, and silicon are all provided to the spontaneous system) which: (1) are distributed homogeneously throughout the matrix metal, (2) are reduced in size, and (3) exhibit a desired morphology. Such improved microstructure possesses a reduced quantity of flaws or defects (e.g., occlusions of large precipitates of $Mg_2Si$) that may weaken the mechanical properties of the formed matrix metal composite body. Accordingly, the present invention may enhance the bend strength, fracture toughness, etc., of the formed metal matrix composite.

Moreover, reheating and quenching may be utilized to improve the microstructure of a metal matrix composite body in a reversible and controllable manner. Specifically, a relatively rapid quench rate may provide small and evenly distributed platelets of precipitates within the metallic constituent of the metal matrix composite. However, if larger platelets or spheres of precipitates are desired for a particular end-use, the metal matrix composite previously discussed may be reheated again and cooled at a rate which is slower than the original quench rate. The slower quench rate provides an adequate amount of time to permit larger precipitates to be formed. Further, reheating and quenching a formed metal matrix composite may permit utilization of a wider range of raw materials from which a metal matrix composite can be fabricated (e.g., when Mg and Si are both used with an aluminum matrix metal a higher concentration of Mg and/or Si could be used because the likelihood of the formation of large precipitates of $Mg_2Si$ in the aluminum metallic constituent is minimized). Specifically, reheating and quenching causes a higher percentage of intermetallic compounds or precursors thereof to remain in solution with the matrix metal. Thus, higher concentrations of intermetallic compounds or precursors thereof may be introduced into the filler material or preform and/or the matrix metal alloy without excessive formation of undesirably sized precipitates in the formed metal matrix composite.

When a metal matrix composite is heated to temperatures greater than the liquidus temperature of the matrix metal, a portion of the matrix metal may separate from the composite. Any undesirable matrix metal separation may be ameliorated by applying a coating of a barrier material to at least a portion of the surface of the metal matrix composite before reheating the composite. Suitable barrier coatings may comprise colloidal graphite (e.g., DAG 154 graphite), a mixture of calcium carbonate and colloidal silica, and colloidal vermiculite, etc.. Alternatively, the metal matrix composite may be embedded within a barrier material during reheating. The heated metal matrix composite thereafter is removed from the bedding of barrier material and directionally solidified, as discussed above.

EXAMPLE 1

The following example demonstrates the utilization of a directional solidification technique in combination with a novel method of forming a metal matrix composite by a spontaneous infiltration technique to achieve a metal matrix composite having superior tensile strength relative to a metal matrix composite body produced by a similar spontaneous infiltration technique without being combined with a directional solidification step.

A porous preform, hereinafter referred to as Preform No. 1, having dimensions of about 5 inches by 5 inches by 0.8 inch was infiltrated, in the presence of a nitrogen atmosphere by a molten commercial aluminum alloy containing magnesium. The preform was comprised of approximately 12 percent by volume alumina fibers (at least 90 percent by weight of the alumina fibers was Fiber FP produced by the Du Pont Company) and the alumina fibers were bound together with colloidal alumina. The colloidal alumina/fiber weight ratio was approximately ⅛ and the balance of the preform volume comprised interconnected porosity. The infiltration of the preform was obtained through the procedure described in the following paragraphs.

As shown in FIG. 1, an approximately 1 inch layer of a 24 grit alumina material (17) produced by Norton Company and sold under the trademark ALUNDUM ® was placed in the bottom of a graphite boat (10). A box (12) formed from a 15/1000 inch thick Grade GTB graphite tape product produced by Union Carbide and sold under the trademark GRAFOIL ® was placed on top of the 1 inch layer of ALUNDUM ® (17) contained within the graphite boat (10). The GRAFOIL ® box (12) was produced by stapling appropriately sized sections of the GRAFOIL ® together and thereafter sealing the seams with a slurry made by mixing graphite powder (grade KS-44 from Lonza, Inc.) and colloidal silica (LUDOX ® HS from Du Pont). The weight ratio of graphite to colloidal silica was about ⅓.

After the GRAFOIL ® box (12) was placed on top of the initial layer of ALUNDUM ® (17), additional ALUNDUM ® (14) was added to the graphite boat (10) around the outside of the GRAFOIL ® box (12) until the level of the resulting ALUNDUM ® bed (14) within the graphite boat (10) was approximately level with the top of the GRAFOIL ® box (12). At this point, Preform No. 1, labelled (16) in FIG. 1, was placed in the bottom of the GRAFOIL ® box (12) and an ingot (18) of commercially available 520.2 alloy having the approximate dimensions of 4¾ inches by 4¾ inches by ½ inch was placed on top of the preform (16).

The setup comprising the graphite boat (10) and its contents was placed within a controlled atmosphere electric resistance furnace (i.e., a vacuum furnace) at room temperature. The furnace was then evacuated at room temperature until a high vacuum (approximately $1 \times 10^{-4}$ Torr) was obtained. Once the vacuum was established, the furnace temperature was ramped over a 45 minute period to about 200° C. and held for about two hours at this temperature. After the two hour holding period, the furnace was backfilled with nitrogen gas to approximately one atmosphere and a continuous gas flow rate of 2 liters/minute was established. The furnace temperature was then raised to about 700° C. over a 5 hour period and held at about 700° C. for about 20 hours. After the approximately 20 hour heating period, the furnace was turned off and the setup was allowed to cool inside the furnace to ambient temperature.

After reaching ambient temperature, the setup was removed from the furnace and disassembled. The metal matrix composite obtained from the setup was cut into two equal pieces and one of the pieces, hereinafter referred to as piece A, was subjected to a T4 solution heat treatment. The T4 solution heat treatment comprised soaking the metal matrix composite at about 432° C. for about 18 hours and then immediately quenching the metal matrix composite in boiling water at about 100° C. for approximately 20 seconds. The other metal matrix composite piece, hereinafter referred to as piece B, was not subjected to any heat treatment.

A second preform, hereinafter referred to as Preform No. 2, comprised of the same materials as Preform No. 1 but having dimensions of about 5¾ inches by 5¾ inches by 0.8 inch, was infiltrated under a nitrogen atmosphere with a commercial aluminum alloy containing magnesium. The infiltration of the preform was obtained through the procedure described in the following paragraphs.

Figure 2:
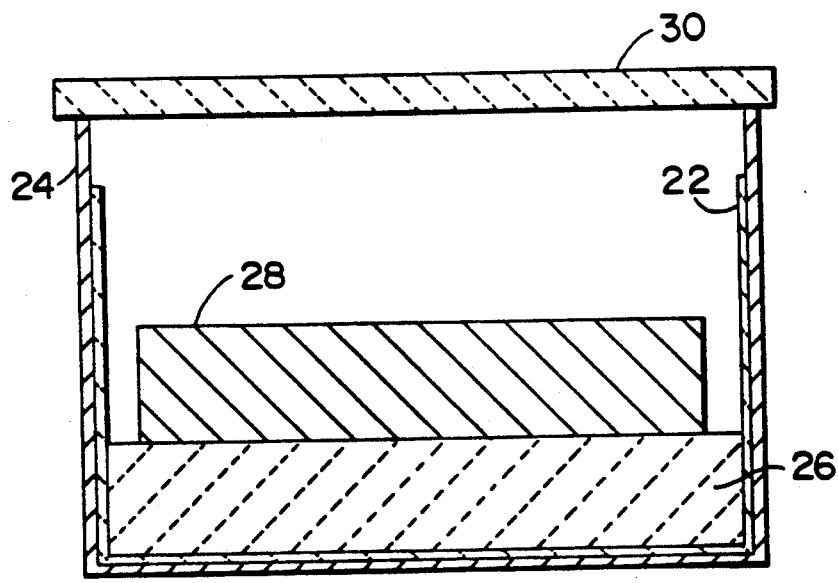
FIG. 2 is a cross-sectional view of the materials utilized in Example 1 to obtain a spontaneous infiltration of a second preform.

As shown in FIG. 2, an approximately 5¾ inch by 5¾ inch by 3 inch GRAFOIL ® box (22) produced in the manner described above, was placed within an approximately 6 inch by 6 inch by 6½ inch stainless steel box (24). The preform (Preform No. 2), labelled (26) in FIG. 2, was placed within the GRAFOIL ® box (22) and an approximately 3½ inch by 3½ inch by ½ inch ingot (28) of commercially available aluminum alloy 520.2 was placed on top of the preform (26). The top of the stainless steel box (24) was then covered with an approximately ⅛" thick plate (30) of an insulating material produced by McNeil Refractories Inc. and sold under the trademark FIBERFRAX ® Duraboard HD. The setup comprising the FIBERFRAX ® plate (30) covering the stainless steel box (24) and its contents was placed within a controlled atmosphere electric resistance furnace (i.e., a vacuum furnace) at room temperature. The furnace was then evacuated at room temperature until a high vacuum (approximately $1 \times 10^{-2}$ Torr) was obtained. Once the vacuum was established, the furnace was backfilled at room temperature with nitrogen gas to approximately one atmosphere and a continuous gas flow rate of about 2500 cc/minute was established. The furnace temperature was then raised to about 725° C. at a rate of about 150° C./hour. The furnace was held at about 725° C. for about 15 hours during which time the aluminum alloy ingot melted and spontaneously infiltrated the preform.

Figure 3:
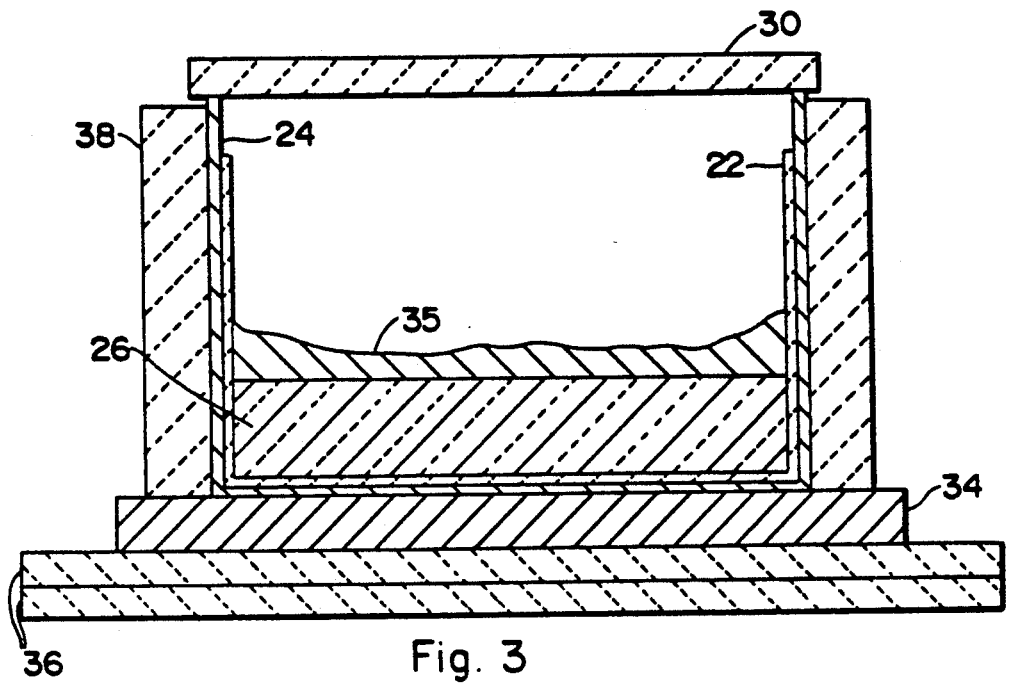
FIG. 3 is a cross-sectional view of the materials displayed in FIG. 2 after the spontaneous infiltration of the matrix metal into the preform has occurred.

After the approximately 15 hour heating period, the furnace was allowed to cool to about 675° C. At this temperature, the setup was removed from the furnace and, as shown in FIG. 3, was placed on top of a steel plate (34) which sat on top of two graphite plates (36). In addition, as shown in FIG. 3, four refractory bricks (38) were placed around the stainless steel box (24) in order to insulate the setup and maintain the alloy in a molten state during the directional solidification process. Each refractory brick (38) was in contact with one of the four sides of the stainless steel box (24). The directional solidification of the molten alloy in the setup occurred through the absorption by the graphite plates (36) of the heat energy drawn from the setup through the steel plate (34). Thus, the steel plate (34) transferred the heat from the bottom of the setup to the graphite plates (36) which acted as a heat sink. In this manner, the setup was directionally cooled from its base towards the excess alloy (35) on its surface.

After cooling below the solidification temperature for the aluminum alloy, the setup was disassembled and a metal matrix composite was recovered. The metal matrix composite was cut into two equally sized pieces. The first piece, hereinafter referred to as piece C, was subjected to a T4 heat treatment. This heat treatment is described above. The second piece, hereinafter referred to as piece D, was not subjected to any heat treatment.

The four pieces, pieces A, B, C and D, were subjected to the standard tensile strength measurement test described in the following paragraph.

Test coupons measuring about 0.10 inch thick by about 0.50 inch wide by about 5 inches long were cut from each metal matrix composite piece. The coupon geometry followed ASTM Std. D 3552-77 (Reapproved 1982) FIG. 1, specimen B, except that the dogbone radius used was 4 inches nominal. Each coupon was mounted in suitable grips of a test machine and a load was applied (by pulling on one end of the coupon) at an approximately constant crosshead rate of 0.02 inch/minute (0.508 mm/min) until the test coupon failed. The results of these tensile strength tests are summarized in Table 1.

The results summarized in Table 1 demonstrate that the utilization of directional solidification in the formation of a metal matrix composite body can increase the tensile strength of the metal matrix composite body. In addition, heat treating a directionally solidified metal matrix composite body may further increase the tensile strength. It is believed that the dramatic increase in tensile strength which occurs upon directional solidification is the result of the reduction of porosity or void space in the metal matrix composite body. This reduction in porosity or void space increases the load bearing area thereby increasing the tensile strength of the metal matrix composite body.

EXAMPLE 2

The following example demonstrates the utilization of a directional solidification technique in combination with a novel method of forming a metal matrix composite by a spontaneous technique to achieve a metal matrix composite displaying reduced porosity or void space relative to a similarly formed metal matrix composite body which was not subjected to a directional solidification.

Figure 4:
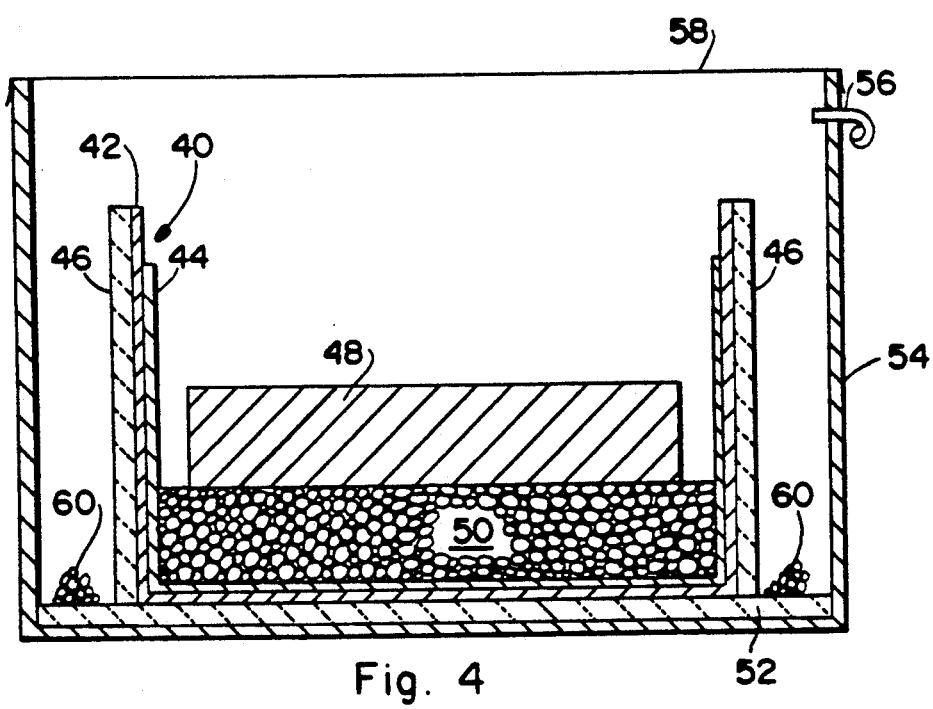
FIG. 4 is a cross-sectional view of the materials utilized in Example 2 to obtain a spontaneous infiltration of a mass of filler material.

As shown in FIG. 4, approximately 263 grams of 1000 grit green silicon carbide produced by Norton Co. and sold under the trade name 39 CRYSTOLON ® was admixed with approximately 2% by weight (5.8 grams) powdered magnesium, the mixture being referenced as (50), and the mixture (50) was placed within a box (40) having approximate dimensions of 6 inches by 3 inches by 5 inches and constructed of approximately 1/10 inch thick carbon steel (42) having an inner lining (44) of an about 15/1000 inch thick Grade GTB graphite tape product known by the trade name GRAFOIL ® and produced by Union Carbide. The outside of the box (40) was lined with approximately ⅛ inch thick prefired FIBERFRAX ® Duraboard HD produced by McNeil Refractories Inc. and labelled (46) in FIG. 4. An approximately 520.2 gram ingot (48) of an aluminum alloy comprising 12% by weight silicon, 5% by weight zinc, 6% by weight magnesium, and the balance aluminum, was placed on top of the bed (50) of 1000 grit silicon carbide/magnesium mixture. This assembly was placed on top of an approximately ⅛ inch thick plate (52) of the FIBERFRAX ® material described above which was situated on the bottom of a stainless steel container (54) having a nitrogen gas feed (56) and a copper foil cover (58). Titanium sponge (60) was placed within the stainless steel container but outside of the FIBERFRAX ® (46) containing the mixture (50) and aluminum alloy (48). The titanium sponge (60) was placed within the container (54) to function as an oxygen getter. The container (54) was placed within a electric resistance heated furnace which was open to the air and heated from ambient temperature to about 250° C. over a period of approximately 40 minutes; held at about 250° C. for about one hour; ramped to about 800° C. over a period of about three hours; held at about 800° C. for about 2.5 hours; and then removed from the furnace at about 800° C. While the container was in the furnace, nitrogen was supplied through the feed (56) into the interior of the container (54) at a rate of about 5 liters/minute and the pressure inside the furnace was maintained at about one atmosphere. After removal from the furnace at about 800° C., the setup was directionally solidified on a water cooled copper top chill

TABLE 1

| Piece | Alloy | Time (°C.)/ Time (hrs.) | Heat-Treatment | Other | Tensile Strength (ksi) |
| --- | --- | --- | --- | --- | --- |
| A | Al-10.5 Mg (520.0) | 700/20 | T4 | DIRECTIONALLY SOLIDIFIED | 22 (MAX.) |
| B | Al-10.5 Mg (520.0) | 700/20 | NONE | FURN. COOL | 24 (MAX.) |
| C | Al-10.5 Mg (520.0) | 725/15 | T4 | DIRECTIONALLY SOLIDIFIED | 40.3 = 0.9 |
| D | Al-10.5 Mg (520.0) | 725/15 | NONE | FURN. COOL | 36.2 = 0.7 | plate for about ½ hour and then immersed in water at ambient temperature.

Upon reaching ambient temperature, the setup was removed from the water and disassembled. Examination of the metal matrix composite obtained from the setup revealed that the composite had less porosity or void space than previous metal matrix composites produced without directional solidification.

EXAMPLE 3

This Example demonstrates that the distribution, morphology, and size of precipitates formed within the metallic constituent of a formed metal matrix composite may be modified by heating a metal matrix composite to a temperature in excess of the liquidus temperature of the matrix metal and directionally solidifying the composite, per se.

An open ended steel box for housing the spontaneous infiltration process was formed by constructing a steel frame, comprising four (4) steel plates, which were joined together at 90 degree angles, onto a steel plate that measured about 7 inches (178 mm) long, about 7 inches (178 mm) wide, and about 0.25 inch (6.4 mm) thick. The steel frame measured about 5 inches (127 mm) long, about 5 inches (127 mm) wide, about 2.75 inches (70 mm) deep, with a wall thickness of about 0.3 inch (7.9 mm). The resultant steel box was lined with a graphite foil box, measuring about 5 inches (127 mm) long, about 5 inches (127 mm) wide, and about 3 inches (76 mm) tall. The graphite foil box was fabricated from a sheet of PERMA FOIL ® graphite foil (TT America, Portland, Oreg.) which was about 11 inches (279 mm) long, about 11 inches (279 mm) wide, and about 0.01 inch (0.25 mm) thick. Four parallel cuts were made into the graphite foil which measured about 3 inches (76 mm) from the side and about 3 inches (76 mm) long. The cut graphite foil was then folded and stapled to form the graphite foil box which was placed into the steel box.

About 775 grams of the filler material to be spontaneously infiltrated, which comprised by weight about 98% 39 CRYSTOLON ® 220 grit silicon carbide (Norton Company, Worcester, Mass.) and about 2% AESAR ® −325 mesh magnesium powder (Johnson Matthey, Seabrook, N.H.), was prepared by pouring the filler material mixture into a plastic jar and shaking the mixture by hand for about 15 minutes. The filler material mixture was poured into the graphite foil lined steel box discussed above until a depth of about 0.75 inch (19 mm) was obtained. The surface of the filler material mixture was then sprinkled with about 4 grams of −50 mesh magnesium powder (ALFA ® Products, Morton Thiokol, Inc., Denvers, Mass.).

An ingot of matrix metal, which weighed about 1397 grams and comprised by weight about 15% silicon and the balance aluminum, was placed upon the coated filler material within the steel box.

An open ended stainless steel container for housing the steel box and its contents measured about 10 inches (254 mm) long, about 10 inches (254 mm) wide, and about 8 inches (208 mm) high. The bottom of the stainless steel container was covered with a piece of graphite foil measuring about 10 inches (254 mm) long, about 10 inches (254 mm) wide, and about 0.010 inch (0.25 mm) thick. A fire brick was placed onto the graphite foil in the bottom of the stainless steel container. Approximately 20 grams of titanium sponge (Chemalloy Incorporated, Bryn Mawr, Pa.), was sprinkled onto the graphite foil in the bottom of the stainless steel container and around the fire brick. The titanium sponge functioned as an oxygen getter. The steel box and its contents were placed into the stainless steel container onto the fire brick. A sheet of copper foil was placed over the opening of the stainless steel container to form an isolated chamber which enclosed the steel box. A nitrogen purge tube was inserted through the sheet of copper foil. The stainless steel container and its contents formed an assembly similar to FIG. 4. The stainless steel container and its contents were placed in an electric resistance air atmosphere box furnace.

The furnace was heated from room temperature to about 600° C. at a rate of about 450° C. per hour. The nitrogen flow rate through the purge tube was about 10 liters per minute. The furnace was heated from about 600° C. to about 800° C. at a rate of about 450° C. per hour while utilizing a nitrogen flow rate of about 2 liters per minute. The furnace and its contents were maintained at about 800° C. for about 2.5 hours with a nitrogen flow rate of about 2 liters per minute. The stainless steel container and its contents were removed from the furnace. The steel box was removed from the stainless container and placed onto a room temperature, water cooled, copper-chill plate, having dimensions of about 8 inches (203 mm) long, about 8 inches (203 mm) wide, about 0.5 inch (13 mm) thick in order to directionally solidify the metal matrix composite. After the metal matrix composite had been substantially solidified, it was immersed into a room temperature water bath. The formed metal matrix composite was then removed from the steel box.

The metal matrix composite body was then cut using a diamond saw into sections measuring about 1 inch (25 mm) long, about 0.24 inch (6 mm) wide, and about 0.20 inch (5 mm) thick. A section of the metal matrix composite was placed onto a graphite plate. The graphite plate, holding the metal matrix composite body, was placed into a retort within an electric resistance furnace. Nitrogen flowed into the retort at a rate of about 10 liters per minute. The furnace was heated from room temperature to about 780° C. at a rate of about 600° C. per hour. After about 30 minutes at about 780° C., the flowing nitrogen atmosphere of about 10 liters per minute was interrupted, and the retort door was opened. The graphite plate holding the metal matrix composite body was removed from the retort and the metal matrix composite body was submerged into a water quench bath. The water quench bath was at about room temperature and was contained within a stainless steel receptacle measuring about 10 inches (254 mm) long, about 12 inches (305 mm) wide, and about 10 inches (254 mm) deep.

Figure 9A:
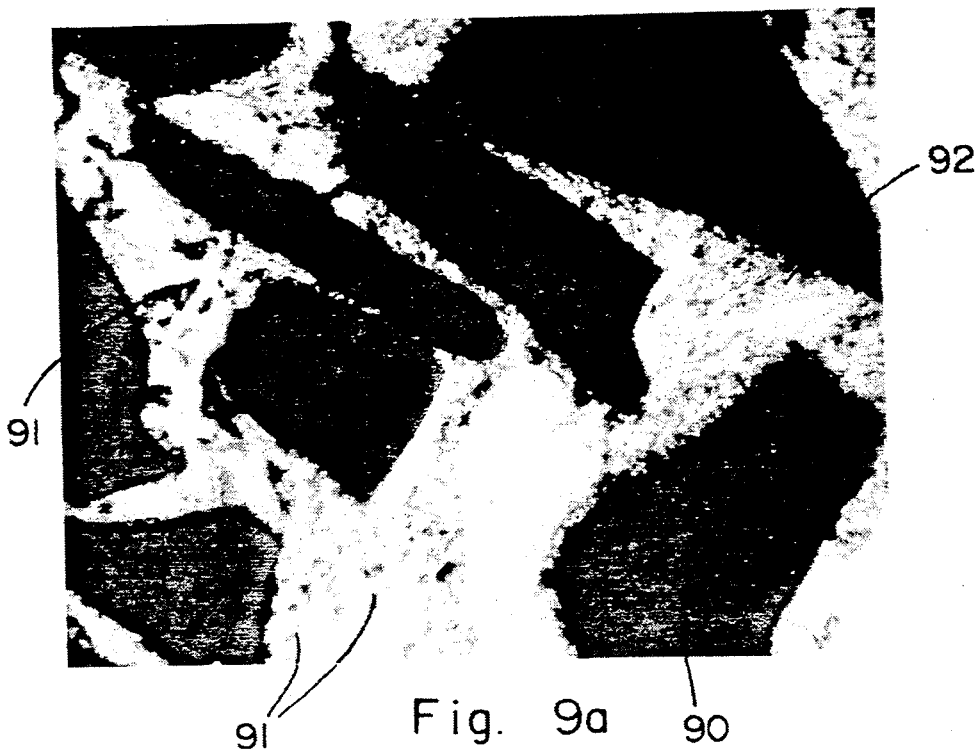
FIG. 9a is an optical photomicrograph at 1000× of a section of a directionally solidified metal matrix composite.
Figure 9B:
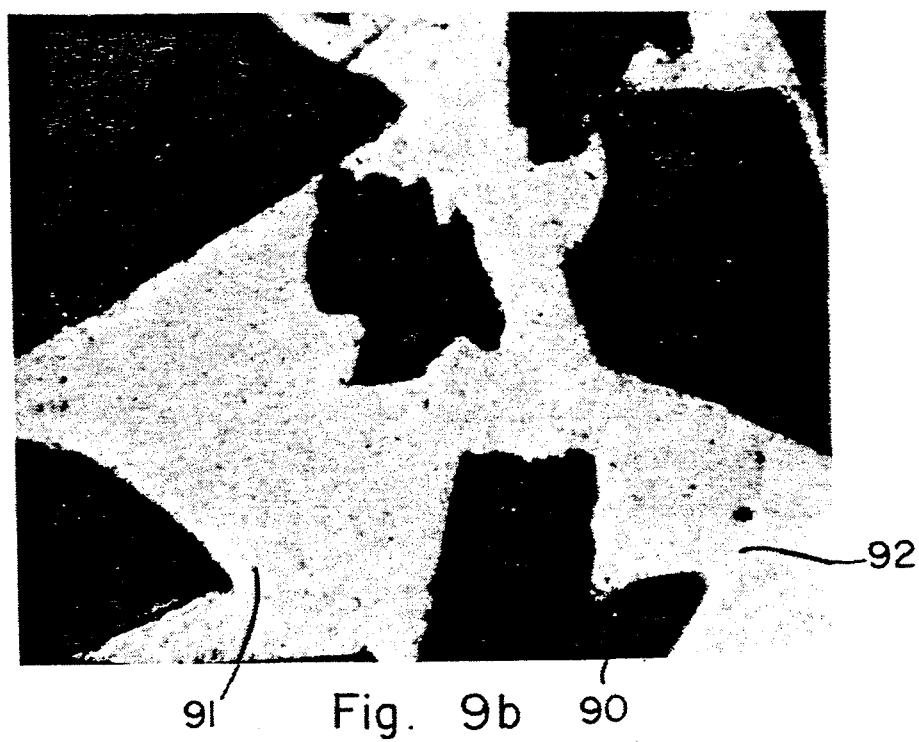
FIG. 9b is an optical photomicrograph at 1000× of a section of a directionally solidified metal matrix composite which was reheated and quenched.

After the metal matrix composite body had cooled to about room temperature, it was retrieved from the water quench bath. A sample of the as fabricated metal matrix composite body and a sample of the reheated and water quenched metal matrix composite body, respectively, were examined to determine the effect of the reheat and water quench treatment on the resulting microstructure of the body. Specifically, FIG. 9a is an optical photomicrograph at 1000× of a representative section of the microstructure of the as fabricated metal matrix composite body. FIG. 9a shows silicon carbide filler material 90, and the matrix metal 92 which contains precipitates 91. Precipitates 91 comprise $Mg_2Si$, which is relatively brittle in comparison to the other components of the metal matrix composite and may be an undesirable component of the composite body for some end-use applications. FIG. 9b is an optical photomicrograph at about 1000× of a section of the microstructure of the reheated and quenched metal matrix composite body which shows the silicon carbide filler 90, the matrix metal 92 and precipitates 91. A comparison of FIGS. 9a and 9b demonstrates that the quantity and size of precipitates 91 have been reduced. Further, FIG. 9b shows that the precipitates 91 are distributed more homogeneously throughout the matrix metal 92.

EXAMPLE 4

This Example demonstrates that the present invention may be utilized to reheat and quench a directionally solidified metal matrix composite having an unusual shape.

A mold having a trapezoidal cross-section was utilized to define the shape of the filler material to be spontaneously infiltrated. One end of the mold was closed and measured about 3 inches (76 mm) long and about 3 inches (76 mm) wide. The opposite end of the mold was open and measured about 3.75 inches (95 mm) long and about 3.75 inches (95 mm) wide. The mold was fabricated from 14 gauge carbon steel and had a height of about 2.5 inches (64 mm). The inner-surface of the mold had four (4) layers of graphite which was applied by airbrushing a mixture comprising by volume about 40% DAG 154 colloidal graphite (Acheson Colloid, Port Huron, Mich.) and about 60% ethanol (Pharmco Products, Inc., Bayonne, N.J.). Each coat of the graphite mixture was permitted to dry before a subsequent coat was applied to the trapezoidal mold.

The trapezoidal mold was placed into an electric resistance air atmosphere furnace at a temperature of about 380° C. for a period of about 2 hours in order to permit the colloidal graphite coating to adhere to the interior of the mold.

The filler material mixture to be utilized for spontaneous infiltration comprised by weight about 78% 39 CRYSTOLON® 220 grit silicon carbide (Norton Company, Worcester, Mass.), about 19% 500 grit silicon carbide, and about 2% −325 mesh magnesium powder (Reade Manufacturing Company, Lakehurst, N.J.). The filler material mixture was placed into a plastic jar and mixed on a ball mill for about 1 hour. After ball milling, the contents of the plastic jar were further mixed by manually shaking the plastic jar.

The filler material mixture to be spontaneously infiltrated was poured into the bottom of the trapezoidal mold discussed above. About 300 grams of the filler material mixture was poured into the mold and smoothed by hand to provide a generally level surface. The filler material mixture was partially covered with about 3.6 grams of −50 mesh magnesium powder (ALFA® Products, Morton Thiokol, Inc., Denvers, Mass.).

Matrix metal ingots, which weighed about 658 grams and comprised by weight about 12% Si, 2.5% Ni, 1.0% Cu, and the balance aluminum, were placed upon the magnesium coated filler material mixture within the trapezoidal coated mold.

A carbon steel container for holding the trapezoidal mold and its contents measured about 12 inches (305 mm) long, about 10 inches (254 mm) wide, and about 10 inches (254 mm) high. A sheet of PERMA FOIL® graphite foil (TT America, Portland, Oreg.) measuring about 12 inches (305 mm) long, about 10 inches (254 mm) wide, and a thickness of about 0.01 inch (0.25 mm) was utilized to line the inner cavity of the carbon steel container. The trapezoidal mold and its contents were placed into the carbon steel container and upon the graphite liner. A titanium sponge material (Chemalloy Company, Inc., Bryn Mawr, Pa.) weighing about 15 grams and about 4 grams of −50 mesh magnesium powder (ALFA® Products, Morton Thiokol, Inc., Denvers, Mass.) were poured into the carbon steel container and around the trapezoidal mold. A sheet of copper foil was placed over the opening of the carbon steel container to form an isolated chamber within the carbon steel container. A nitrogen purge tube was inserted into a side wall of the carbon steel container. The carbon steel container and its contents formed an assembly similar to that shown in FIG. 4.

The copper foil-covered carbon steel container and its contents were placed into an electric resistance air atmosphere furnace. While heating the furnace from room temperature to about 600° C., at a rate of about 400° C. per hour, the nitrogen flow rate was about 10 liters per minute. The temperature of the furnace was increased from about 600° C. to about 800° C., at a rate was about 400° C. per hour. During this heating step, the nitrogen flow rate was about 2 liters per minute. After about 2 hours at about 800° C., the carbon steel container and its contents were removed from the furnace. The trapezoidal mold and its contents were removed from the carbon steel container and were placed onto a room temperature copper-chill plate which measured about 6 inches (152 mm) long, about 6 inches (152 mm) wide, and about 1.5 inches (38 mm) high in order to directionally solidify the formed metal matrix composite.

The reheat and directional solidification procedures described above in Example 3, were substantially repeated. A comparison of the microstructures of the as fabricated metal matrix composite body to the microstructure of the reheated and directionally solidified metal matrix composite body revealed that the reheat and water quenching treatment reduced the size and quantity of intermetallic precipitates found within the matrix metal of the composite body.

EXAMPLE 5

As shown in FIG. 10, a graphite mold 200 for defining the shape of a filler material 202 to be spontaneously infiltrated by molten matrix metal 201 was fabricated from eight (8) plates of Grade ATJ graphite (Union Carbide Corporation, Carbon Products Division, Cleveland, Ohio) which has been machined appropriately by Graphite Engineering & Sales Co., Greenville, Mich. The surfaces of the graphite plates which contacted the filler material 202 were coated twice with a mixture comprising by volume about 50% DAG 154 colloidal graphite (Acheson Colloids, Port Huron, Mich.) and about 50% ethanol prior to their assembly to form the graphite mold. The graphite mold 200 comprised a base 203 measuring about 4 inches (102 mm) long, about 3.75 inches (95 mm) wide, and about 0.25 (6.4 mm) thick, and had two (2) opposing dove-tailed grooves (not shown in FIG. 10) which extended parallel to the 4 inch (102 mm) dimension of the base. Two side walls 204 (only three slots 205 shown in FIG. 10), each measuring about 7.13 inches (181 mm) long, about 4 inches (102 mm) wide, and about 0.25 inch (6.4 mm) thick and having five (5) slots running the entire length of each of the side walls 204 were each inserted into one of the dove-tail grooves in the base 203. As a result, the slots 205 of the side walls 204 were oriented perpendicular to the base 203. Two of the five (5) slots 205 in each side wall 204 were located about 0.75 inch (19 mm) from the each end of each side wall 204 and comprised dove-tailed grooves for receiving the dove-tailed portions of the remaining two (2) end walls 206. The two (2) end walls 206 each measured about 7 inches (178 mm) long, about 3 inches (76 mm) wide, and about 0.25 inch (6.4 mm) thick. The dove-tailed portions of the end walls 206 were each inserted into the dove-tailed grooves of the side walls 204 and pushed downwardly until contacting the base 203. The assemblage of base, end walls, and sidewalls define the mold 200 having a cavity or central portion.

The central cavity portion of the mold 200 was divided by three (3) plates of graphite 207 measuring about 4 inches (102 mm) high, about 2.75 inches (70 mm) wide, and about 0.25 inch (6.4 mm) thick and which were oriented perpendicularly to the base 203 and inserted into the slots 204 of the side walls 204. The graphite plates 207 within the mold 200 defined four (4) chambers 208 each measuring about 4 inches (102 mm) high, about 2.63 inches (67 mm) wide, and about 0.25 inch (6 mm) thick.

The joints and seams between the intersection of the base 203, the side walls 204, and the chambers 208 were sealed with DAG 154 colloidal graphite 209 which was applied with a cotton swab. After the colloidal graphite seals had air dried, the graphite mold 208 was placed into an electric resistance air atmosphere furnace at a temperature of about 380° C. After about 2 hours at about 380° C. the colloidal graphite seals and surface coatings were cured and adhered to the mold. The graphite mold was permitted to cool to about room temperature.

A filler material mixture 210 which comprised by weight of about 78%, 39 CRYSTOLON® 220 grit silicon carbide (Norton Company, Worcester, Mass.), about 19%, 39 CRYSTOLON® 500 grit silicon carbide, and about 3%, −325 mesh magnesium powder (Reade Manufacturing Company, Lakehurst, N.J.) was prepared by placing the filler material mixture into a plastic jar with about 0.94 inch (24 mm) diameter alumina balls (Standard Ceramic Supply Company, Division of Chem-Clay, Pittsburgh, Pa.). The volume ratio of alumina balls to filler material was about 2:1. The plastic jar and its contents were placed onto a ball mill for about 1 hour to mix the filler material mixture.

A substantially equal amount of filler material mixture 210 was poured into each of the four (4) chambers 208 of the graphite mold 200 until a depth of about 3 inches (76 mm) was reached in each chamber 208. This depth corresponded to about 69 grams of filler material mixture per chamber. After the filler material mixture 210 had been leveled within each chamber 208, about 0.30 grams of an about −50 mesh magnesium powder 211 (ALFA® Products, Morton Thiokol, Inc., Denvers, Mass.) was placed onto the leveled filler material mixture 210 within each chamber 208 of the graphite mold 200. About 204 grams of a matrix metal 201 comprising by weight about 12% Si, 2% Ni, 1% Cu, and the balance aluminum was placed into the graphite mold 200 and was supported by the three (3) graphite plates 207 separating the four (4) chambers 208 within the graphite mold.

The graphite mold 200, and its contents, were placed into a retort within an electric resistance furnace. The furnace and its contents were heated from room temperature at a rate of about 400° C. per hour to about 520° C. while nitrogen was passed through the furnace at a flow rate of about 10 liters per minute. After about 2 hours at about 520° C., with a nitrogen flow rate of about 10 liters per minute, the furnace and its contents were heated at a rate of about 400° C. per hour to about 825° C., while maintaining the nitrogen flow rate of about 10 liters per minute. After about 5 hours at about 825° C., with a nitrogen flow rate of about 10 liters per minute, the power to the furnace was interrupted and the furnace and its contents were permitted to cool naturally to about room temperature. At about room temperature, the graphite mold 200 and its contents were removed. The graphite mold 200 was disassembled and four (4) metal matrix composite plates each measuring about 3 inches (76 mm) long, about 2.75 inches (70 mm) wide, and about 0.25 inch (6.4 mm) thick were recovered.

One of the recovered metal matrix composite plates was selected for further treatment and placed on a graphite plate. The graphite plate was placed into a retort within an electric resistance furnace. A flowing nitrogen atmosphere of about 10 liters per minute was introduced into the retort. The furnace and its contents were heated from room temperature to about 725° C. at a rate of about 600° C. per hour. After about an hour at about 725° C., the flowing nitrogen atmosphere was interrupted, the retort door was opened, the graphite plate supporting the metal matrix composite plate was removed from the furnace and the metal matrix composite plate was placed upon a copper-chill plate which measured about 6 inches (152 mm) long, about 6 inches (152 mm) wide, and about 0.75 inch (19 mm) thick. After the metal matrix composite plate had substantially solidified, the metal matrix composite plate was removed from the copper-chill plate and further directionally solidified by submerging it in a room temperature water quench bath substantially in accordance with Example 3.

Figure 11A:
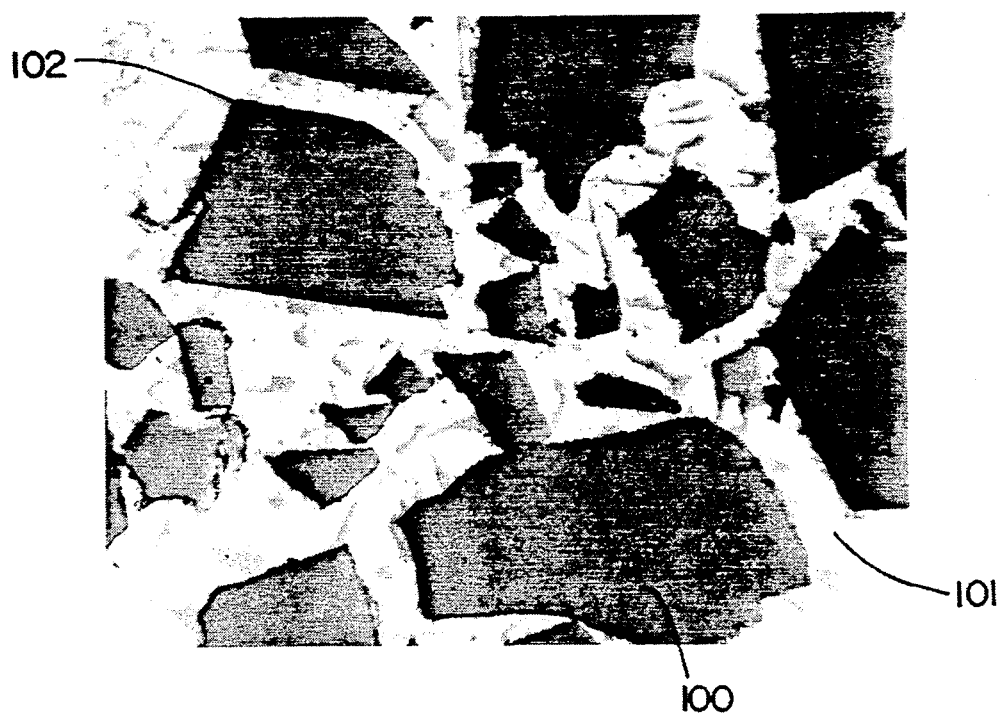
FIG. 11a is an optical photomicrograph at 1000× of a section of a directionally solidified metal matrix composite.
Figure 11B:
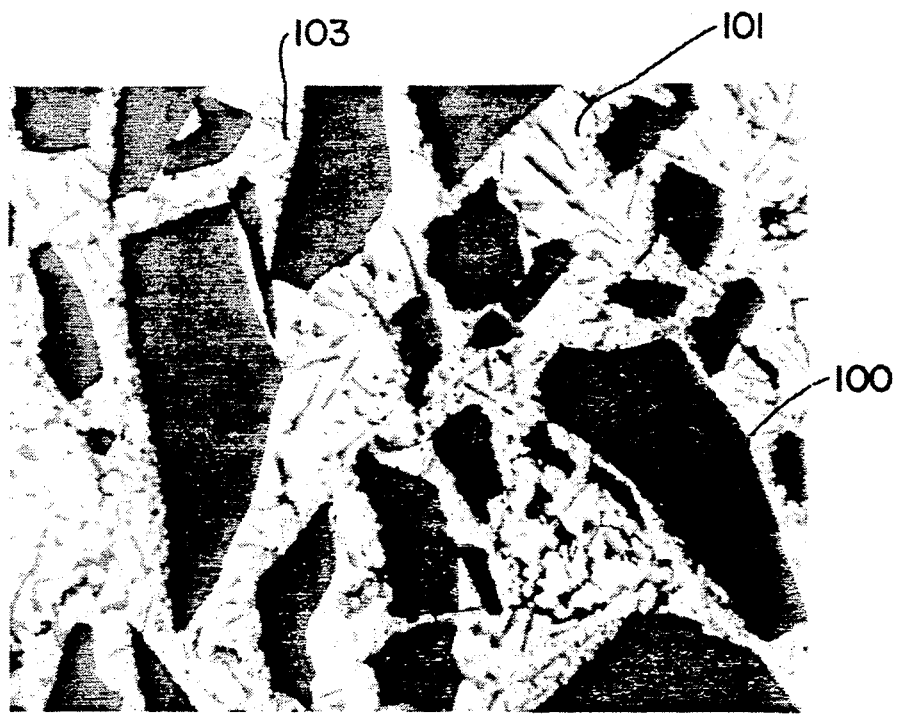
FIG. 11b is an optical photomicrograph at 1000× of a section of a directionally solidified metal matrix composite which was reheated and quenched.

One as fabricated metal matrix composite and one reheated and directionally solidified metal matrix composite plate were sectioned, mounted, and prepared for examination. FIGS. 11a and 11b are photomicrographs, respectively, of the as fabricated metal matrix composite and the reheated and directionally solidified metal matrix composite. Specifically, FIG. 11a is an optical photomicrograph taken at about 1000× of a representative section of the as fabricated metal matrix composite body which shows the silicon carbide filler material 100 and the matrix metal 101 which contains precipitates 102. FIG. 11b is an optical photomicrograph taken at about 1000× of a section of the metal matrix composite body which had been subjected to the reheat and directional solidification treatment which shows the silicon carbide reinforcement 100, the matrix metal 101 and precipitates 103. A comparison of the microstructures shown in FIGS. 11a and 11b demonstrates that the reheating and copper chill plate cooling, followed by a water quench, improves the microstructure and alters the size and distribution of the precipitates within the matrix metal of the resulting metal matrix composite body.

EXAMPLE 6

The following example demonstrates the utilization of a directional solidification technique in combination with a novel method of forming a metal matrix composite body by a spontaneous infiltration technique.

Figure 12:
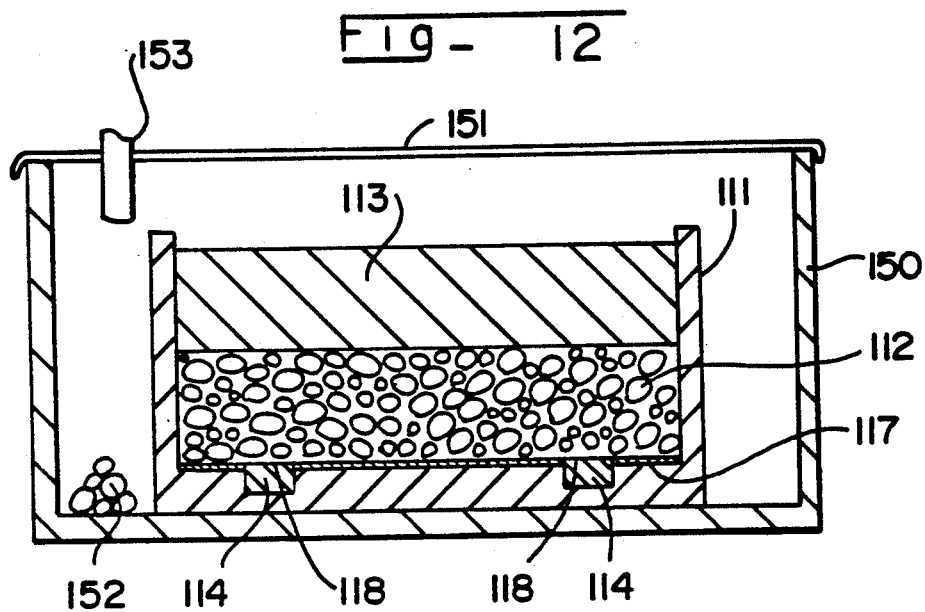
FIG. 12 is a cross-sectional view of the layup used in Example 6 to form a metal matrix composite by spontaneous infiltration.

In reference to FIG. 12, a silica mold (111) having an inner diameter of approximately 5 inches (127 mm) by 5 inches (127 mm) and 3¼ inches (83 mm) in height, and having nine holes of about ¾ inch (19 mm) diameter and ¾ inch (19 mm) depth in the bottom of the mold (111), was formed by first mixing a slurry of about 2.5 to 3 parts by weight of RANCO-SIL® 4 silica powder (Ransom and Randolf of Maumee, Ohio), about 1 part by weight colloidal silica (NYACOL® 830 from Nyacol Products of Ashland, Mass.) and about 1 to 1.5 parts by weight of RANCO-SIL™ A silica sand (Ransom and Randolf of Maumee, Ohio). The slurry was poured into a rubber mold having the negative shape of the desired silica mold and placed in a freezer overnight. The silica mold was subsequently removed from the rubber mold, fired at about 800° C. in an air furnace for about 1 hour and allowed to cool to room temperature.

As further shown in FIG. 12, the bottom surface of the formed silica mold (111) was covered with an approximately 5 inch by 5 inch by 0.010 inch (6.25 mm) thick PF-25-H graphite tape product (117) sold by TT America, Portland, Oreg., under the trade name PERMA FOIL®, having approximately ¾ inch (19 mm) diameter holes (118) cut into the graphite tape sheet (117) to correspond in position to the holes in the bottom of the silica mold (111). The holes in the bottom of the mold (111) were filled with approximately ¾ inch (19 Mm) diameter by ¾ inch (19 mm) thick plugs (114) of a metal identical in composition to the matrix metal alloy, which comprised approximately 10% by weight magnesium and the balance aluminum. Approximately 819 grams of a 500 grit alumina filler material (112), known as 38 ALUNDUM® and produced by the Norton Company, were mixed with about 5 weight percent magnesium powder and shaken for about 15 minutes in a NALGENE™ jar. The filler material (112) was then placed into the mold (111) to a depth of approximately ¾ inch (19 mm) and tamped lightly to level the surface of the filler material (112). Approximately 1399 grams of a matrix metal ingot (113), comprising about 10% by weight magnesium and the balance aluminum, were placed on top of the bed of alumina filler material (112) within the silica mold (111). The mold (111) and its contents were then placed into an approximately 10 inch (254 mm) by 10 inch (254 mm) by 8 inch (203 mm) high stainless steel container (150). A titanium sponge material (152), weighing about 20 grams, from Chemalloy Company Inc., Bryn Mawr, Pa., was sprinkled into the stainless steel can around the silica mold (111). A sheet of copper foil (151) was placed over the exposed surface of the stainless steel container (150) so as to form an isolated chamber. A nitrogen purge tube (153) was provided through the sheet of copper foil (151), and the stainless steel container (150) and its contents were placed into an air atmosphere resistance heated Unique utility box furnace. The system was ramped from room temperature to about 600° C. at a rate of about 400° C. per hour with a nitrogen flow rate of about 10 liters per minute, then heated from about 600° C. to about 775° C. at a rate of about 400° C. per hour with a nitrogen flow rate of about 2 liters per minute. The system was held at about 775° C. for about 1.5 hours with a nitrogen flow rate of about 2 liters per minute. The system was removed from the furnace at temperature, the excess molten alloy was poured out, and a room temperature copper chill plate having dimensions of approximately 5 inches (127 mm) by 5 inches (127 mm) by 1 inch (13 mm) thick was placed within the silica mold (111) such that it contacted a top portion of residual metal (113), to directionally cool the formed composite.

After cooling below the solidification temperature of the aluminum alloy, the setup was disassembled and a metal matrix composite body was recovered. Thus, this example further demonstrates a method for directionally solidifying a metal matrix composite body which was formed by a spontaneous infiltration technique.

EXAMPLE 7

This example demonstrates that a formed metal matrix composite may be modified by quenching the formed metal matrix composite body in an oil bath.

Figure 13:
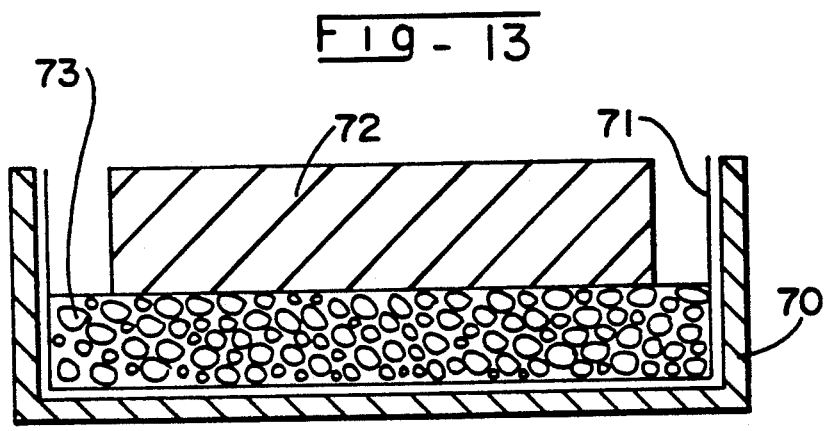
FIG. 13 is a cross-sectional view of the layup used in Example 7 to form a metal matrix composite by spontaneous infiltration.

Referring to FIG. 13, a filler material mixture (73) was prepared by placing about 83 grams of 1000 grit 39 CRYSTOLON® green silicon carbide particulate (Norton Company, Worcester, Mass.) and about 3 grams of −325 mesh magnesium powder into a plastic jar. The filler material mixture (73) was then handshaken for about 15 minutes to obtain a substantially homogeneous mixture. A graphite foil box (71) having internal dimensions of about 2" (50 mm) by 2" (50 mm) by 2½" (63 mm) high was constructed from a single sheet of GRAFOIL® graphite foil (Union Carbide Company, Danbury, Conn.) measuring about 0.015 inch (0.38 mm) thick. Strategically placed staples helped to reinforce the folds in the GRAFOIL® box (71). The GRAFOIL® box (71) was then placed within a graphite boat (70) having interior dimensions substantially the same as the exterior dimensions of the GRAFOIL® box (71). The filler material mixture (73) was poured into the GRAFOIL® box (71) and a level surface was established by smoothing the filler material mixture (73) by hand. An approximately 166 gram ingot of a matrix metal (72) comprising by weight about 22% silicon, 9¼% nickel, 1% copper, 1% iron, and the balance aluminum, was placed into the GRAFOIL® box (71) and on the top surface of the filler material (73) to form a layup. A total of three layups were prepared in this manner.

The three graphite boats and their contents were placed into a retort within an electric resistance furnace. The retort was evacuated to about −28 inches (−711 mm) of mercury vacuum and backfilled with nitrogen gas. The retort was evacuated and backfilled in substantially the same manner a second time. A nitrogen gas flow rate of about 10 liters per minute was established within the retort. The furnace and its contents were heated from about room temperature to about 400° C. at a rate of about 200° C. per hour. At about 400° C., the nitrogen gas flow rate was stopped and the retort was evacuated to about −28 inches (−711 mm) of mercury vacuum and backfilled with nitrogen gas. The retort was evacuated and backfilled with nitrogen gas in substantially the same manner a second time. A nitrogen gas flow rate of about 10 liters per minute was re-established within the retort. The furnace temperature was then raised from about 400° C. to about 500° C. in about ½ hour. After maintaining a temperature of about 500° C. for about 17 hours, the furnace and its contents were heated at a rate of about 200° C. per hour to about 800° C. After maintaining a temperature of about 800° C. for about 3 hours, two graphite boats and their contents were removed from the furnace. The first graphite boat, containing a metal matrix composite formed by spontaneous infiltration, was placed onto a room temperature water cooled copper chill plate and allowed to cool to room temperature. The second graphite boat, also containing a formed metal matrix composite, was placed into a room temperature, straight mineral 100 oil quenching oil bath (Norton Petroleum, Newark, Del.). The power to the furnace was turned off and the third graphite boat, also containing a formed metal matrix composite, was allowed to cool to room temperature while remaining in the furnace.

Three additional metal matrix composite bodies were formed and cooled in substantially the same manner as described above, except that the matrix metals comprised by weight about 12% silicon, 15½% nickel, 1% copper, 1% iron and the balance aluminum.

Test coupons were taken from each metal matrix composite body formed, and the flexural strength of each body was measured. Table 2 lists the results of the flexural strength tests, which indicates a substantial increase in flexural strength of the directionally solidified metal matrix composite bodies as compared to the nondirectionally solidified bodies.

While the preceding Examples have been described with particularity, various modifications to these Examples may occur to an artisan of ordinary skill, and all such modifications should be considered to be within the scope of the claims appended hereto.

balance non-oxidizing gas, contacting said matrix aluminum alloy in a molten state with said permeable mass of filler material or preform, and infiltrating said permeable mass of filter material or preform with said molten matrix aluminum alloy, said infiltration of said permeable mass occurring spontaneously;

after a desired amount of infiltration of said permeable mass of filler material or preform has occurred, or during the spontaneous infiltration step, contacting said infiltrated mass of filler material or infiltrated preform, or a setup containing said infiltrated mass of filler material or infiltrated preform, with a directional solidification means thereby causing said molten aluminum alloy to solidify directionally within said filler material or preform; and heating said directionally solidified metal matrix composite to a temperature in excess of the liquids temperature of the matrix metal, and quenching said heated metal matrix composite, thereby forming a solid metal matrix composite structure embedding at least a portion of said filler material or preform, said directionally solidified and quenched

TABLE 2

Flexural Strength at 25° C. and 400° C. of Metal Matrix Composite Bodies Subjected to Different Cooling Methods

| Alloy Composition | Furnace - Cooled | | | Copper Chill Plate | | | Oil Quenched | | |
| --- | --- | --- | --- | --- | --- | --- | --- | --- | --- |
| | $\sigma 25°$ C. | $\sigma 400°$ C. | $\sigma 25/\sigma 400$ | $\sigma 25°$ C. | $\sigma 400°$ C. | $\sigma 25/\sigma 400$ | $\sigma 25°$ C. | $\sigma 400°$ C. | $\sigma 25/\sigma 400$ |
| Al-22Si-9.25Ni-1Cu-1Fe | 168 | 137 | 1.2 | 354 | 213 | 1.7 | 387 | 213 | 1.8 |
| Al-12Si-15.5Ni-1Cu-1Fe | 132 | 130 | 1.0 | 224 | 196 | 1.1 | 204 | 184 | 1.1 |

What is claimed is:

1. A method of producing a metal matrix composite body comprising:

contacting a molten matrix metal alloy comprising predominantly aluminum and alloying constituents comprising Si, Ni, Cu and Fe, with a permeable material comprising at least one material selected from the group consisting of a mass of filler material and a preform;

spontaneously infiltrating at least a portion of said permeable material with said molten matrix metal;

directionally solidifying at least a portion of said molten matrix metal within said permeable material to form solid matrix metal embedding at least a portion of said permeable material; and heating said directionally solidified metal matrix composite to a temperature in excess of the liquids temperature of the matrix metal, and quenching said heated metal matrix composite, thereby forming a metal matrix composite body.

2. A method of producing a metal matrix composite body comprising:

providing an aluminum alloy;

contacting said aluminum alloy with a permeable mass of filler material or a preform;

supplying at least about one weight percent magnesium to at least one of the aluminum alloy and the permeable mass of filler material or preform;

in the presence of a infiltrating atmosphere comprising from about 10 to 100 volume percent nitrogen, metal matrix composite body exhibiting a flexural strength which is at least 1.5 times greater than the flexural strength of a metal matrix composite formed by substantially the same process steps except for said directional solidification, heating and quenching steps.

3. The method of claim 2, wherein said solid metal matrix composite structure contains less porosity or void space than a similar metal matrix composite structure produced without directional solidification.

4. The method of claim 2, wherein said solid metal matrix composite structure has a greater tensile strength than a similar metal matrix composite structure produced without directional solidification.

5. The method of claim 2, wherein said solid metal matrix composite structure contains a reduced quantity of intermetallic precipitates than a similar metal matrix composite structure produced without reheating and quenching.

6. The method of claim 2, wherein said heated directionally solidified metal matrix composite is thixotropic at said temperatures.

7. The method of claim 2, wherein said filler comprises at least one material selected from the group consisting of oxides, carbides, borides and nitrides.

8. The method of claim 2, wherein said aluminum alloy comprises at least one alloying component selected from the group consisting of Mg, Si, Cu, Ni, Fe, Mn, Cr and Zr.

* * * * *